United States Patent [19]

Kubo et al.

[11] Patent Number: 5,092,190
[45] Date of Patent: Mar. 3, 1992

[54] TRANSMISSION DEVICE

[75] Inventors: Haruaki Kubo; Yoshiyuki Kamanaka, both of Nara, Japan

[73] Assignee: Daishowa Seiki Kabushiki Kaisha, Osaka, Japan

[21] Appl. No.: 461,294

[22] Filed: Jan. 5, 1990

[30] Foreign Application Priority Data

Jan. 13, 1989 [JP] Japan .................................. 1-7326

[51] Int. Cl.$^5$ ............................................. F16H 55/14
[52] U.S. Cl. ........................................ 74/410; 74/433; 475/347
[58] Field of Search ............... 475/317, 345, 348, 347, 475/183, 195, 335, 165; 74/410, 413, 431, 433, 421 R

[56] References Cited

U.S. PATENT DOCUMENTS

| | | | |
|---|---|---|---|
| 1,060,865 | 5/1913 | Sundh | 475/347 X |
| 1,688,194 | 10/1928 | Lyons | 475/335 |
| 3,216,270 | 11/1965 | Nasvytis | 74/410 |
| 3,548,673 | 12/1970 | Suchocki | 74/409 |
| 3,602,070 | 8/1971 | Verge et al. | 475/335 X |
| 4,095,488 | 6/1978 | Nilsson | 475/335 X |
| 4,183,226 | 1/1980 | Osumi | 475/348 X |
| 4,280,376 | 7/1981 | Rosen | 475/348 X |

FOREIGN PATENT DOCUMENTS

| | | |
|---|---|---|
| 53-46561 | 4/1978 | Japan . |
| 56-34194 | 8/1981 | Japan . |
| 56-42531 | 10/1981 | Japan . |
| 6265359 | 4/1983 | Japan .................................. 475/183 |
| 60-4388 | 2/1985 | Japan . |

Primary Examiner—Leslie A. Braun
Assistant Examiner—Khoi Q. Ta
Attorney, Agent, or Firm—Sixbey, Friedman, Leedom & Ferguson

[57] ABSTRACT

A transmission device in which planetary gears are disposed on the periphery of a sun gear so that each planetary gear can effect gear transmission and can revolve around the sun gear, and in which an internal gear wheel is disposed so as to wrap round the planetary gears so that the planetary gears can effect gear transmission in association with the internal gear wheel. A sun roller coaxial with the sun gear and capable of freely rotating independently of the sun gear is provided, and planetary rollers are also provided with being respectively coaxial with the planetary gears, freely rotatable independently of the same and having a rolling contact with the sun roller. An outer ring is disposed around the planetary rollers and has a rolling contact with the planetary rollers.

6 Claims, 3 Drawing Sheets

TRANSMISSION DEVICE

BACKGROUND OF THE INVENTION

This invention relates generally to transmission devices such as gear mechanisms and, more particularly, to a transmission device suitable for a rotary tool holder of a machine tool used to increase or reduce the speed of a rotary tool for drilling, end milling or cutting.

Ordinary gear mechanisms and planetary gear mechanisms having planetary gears and internal gears are generally utilized as effective transmission devices or speed changing devices in the field of machine tools. Such gear mechanisms are free from sliding during transmission and are therefore advantageous in terms of transmission efficiency. They, however, entail the problem such that the distance between transmission shafts and in turn the pitch circle diameter of each gear often varies due to errors in working the gear and/or elastic deformation of the gear during operation in a loaded condition and, hence, the problem of noise and vibrations thereby caused.

Various types of transmission mechanisms have been proposed with a view to solving these problems, including friction gearing mechanisms, planetary friction transmission mechanisms having friction wheels used in place of the gears of the planetary gear mechanism as disclosed in Japanese Utility Model Post-examination Publication Nos. 56-34194 and 56-42531, and planetary traction transmission mechanisms in which an oil film of a traction oil is interposed between contact portions of the frictional wheels so that power can be transmitted through this oil film. In these mechanisms, the wheels operate in a rolling contact manner, and the power can therefore be smoothly transmitted while noise and vibrations are limited. These mechanisms are therefore suitable for high speed rotation and are advantageous in that the accuracy with which the contact surfaces are worked can be improved easily.

However, since friction gearing mechanisms and traction transmission mechanisms are of the rolling contact power transmission type, they are inferior in torque transmission efficiency as compared with ordinary gear mechanisms and are therefore unsuitable for torque transmission under a heavy load.

SUMMARY OF THE INVENTION

In consideration of these circumstances, it is an object of the present invention to provide a transmission device having both the advantages of gear mechanisms and the advantages of friction gearing mechanisms as well as traction transmission mechanisms and suitable for torque transmission at a high speed as well as under a heavy load.

To achieve this object, the present invention provides a transmission device in which a first gear supported on a first shaft meshes with a second gear supported on a second shaft, the transmission device having a freely rotatable roller disposed at least on the first shaft so as to be freely rotatable independently of the first gear, the freely rotatable roller having a rolling contact with the second shaft while transmitting substantially no torque.

In this arrangement, the transmission efficiency is sufficiently high by the effect of the gear transmission mechanism, and the provision of the freely rotatable rollers operating in a non-transmitting rolling contact manner makes it possible to constantly maintain the distance between the transmission shafts and, hence, the pitch circle diameters. Vibrations and noise caused by gear transmission can be absorbed or prevented by the rolling contact between the rollers.

DESCRIPTION OF THE PREFERRED EMBODIMENTS

Embodiments of the present invention will be described below with reference to the accompanying drawings.

Figure 1:
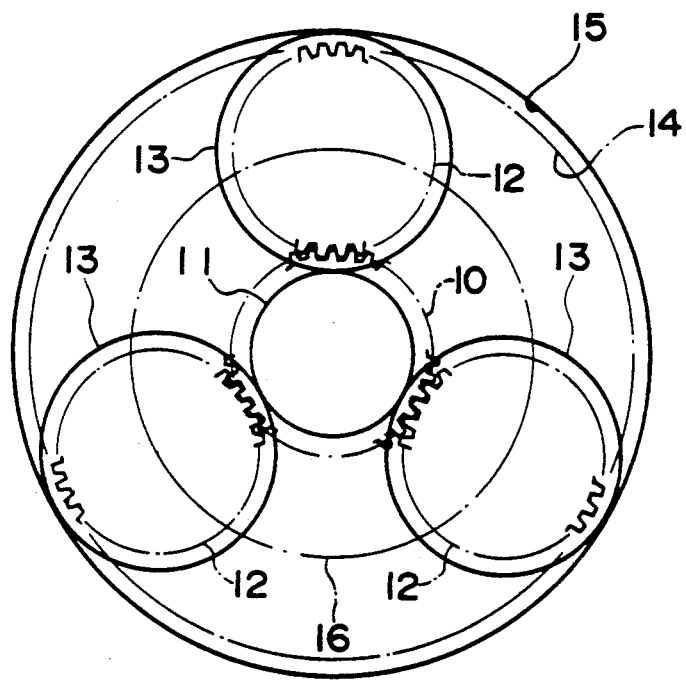
FIG. 1 is a schematic diagram of a basic arrangement of the present invention.

FIG. 1 schematically shows a transmission device or, more specifically, a planetary transmission device to which the present invention is applied. Reference numeral 10 in FIG. 1 denotes a sun gear, and three planetary gears 12 in this embodiment are disposed on the periphery of the sun gear 10. Each planetary gear 12 is capable of effecting gear transmission as well as revolving around the sun gear 10. An internal gear wheel 14 is disposed so as to wrap round the planetary gears 12 so that the planetary gears 12 can effect gear transmission in association with the internal gear wheel 14.

A freely rotatable sun roller 11 is disposed coaxially with the sun gear 10. The diameter of the sun roller 11 is smaller than that of the sun gear 10. Freely rotatable planetary rollers 13 are also disposed coaxially with the corresponding planetary gears 12. The diameter of each planetary roller 13 is larger than that of the planetary gear 12. The planetary rollers 13 have a rolling contact with the sun roller 11. An outer ring 15 surrounds the planetary rollers 13 and has a rolling contact with the same.

If the arrangement is such that the internal gear wheel 14 is stationary and if a cylindrical body 16 on which the shafts of the planetary gears 12 are supported is a driving member while the sun gear 10 is a driven member, this mechanism serves as a speed increasing mechanism. Conversely, if the sun gear 10 is a driving member while the cylindrical body 16 is a driven member, this mechanism serves as a speed decreasing mechanism.

Figure 2:
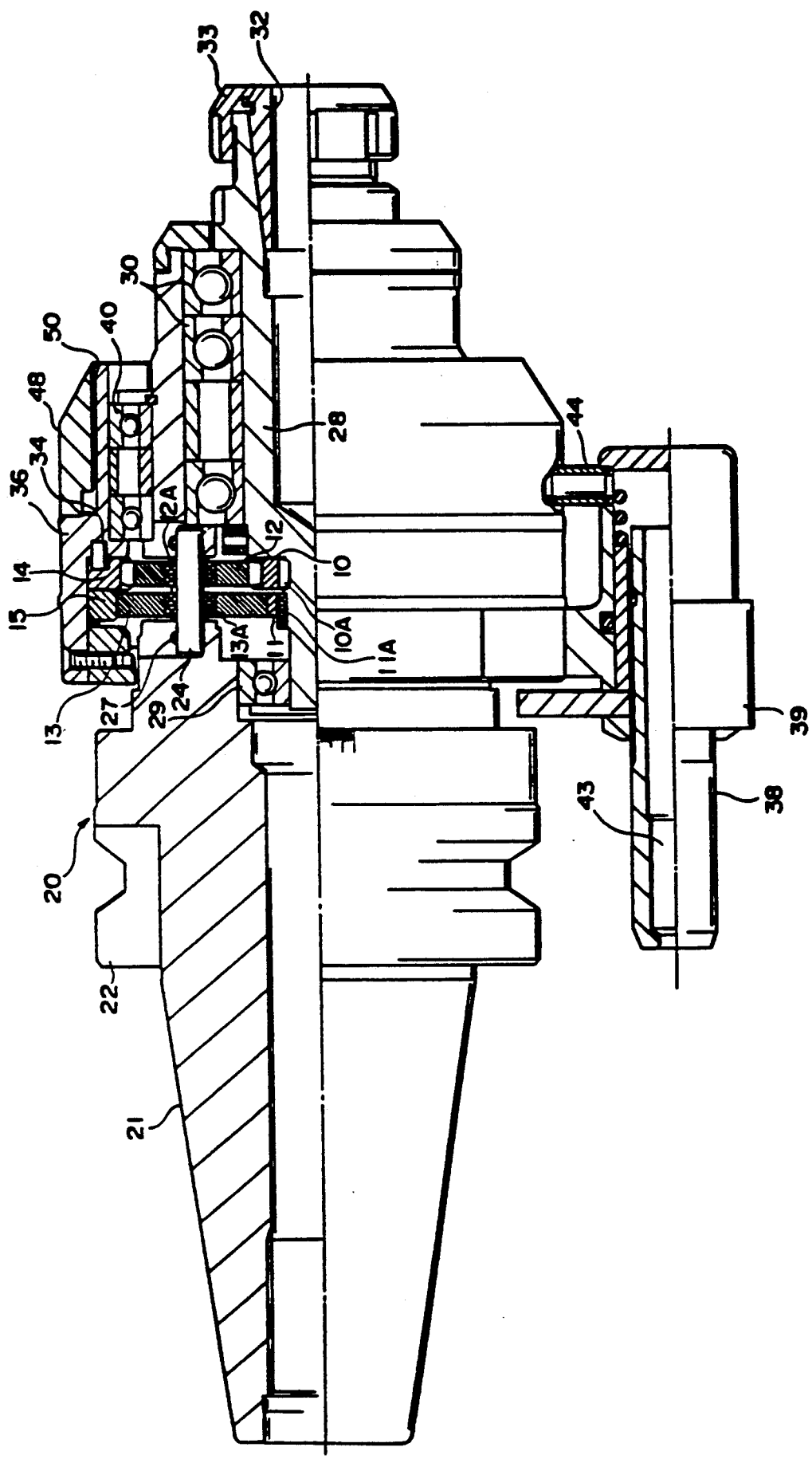
FIG. 2 is a partially sectional side view of a rotary tool holder which represents an embodiment of the present invention.

Referring then to FIG. 2, an embodiment of the present invention is illustrated in which the present invention is applied to a rotary tool holder of a machine tool. A holder body indicated by a reference numeral 20 has a taper shank 21 which serves as an input shaft of a speed increasing mechanism by being coupled to a spindle head of a machining center, not shown, and a positioning flange 22 adjacent to the taper shank 21. Three planetary gears 12 are supported by respective bearing pins 24 on the holder body 20 so as to be arranged at equal intervals in the circumferential direction, as similarly shown in FIG. 1. Each planetary gear 12 is rotatably supported on the bearing pin 24 by a bearing 12A interposed therebetween. Positioning bolts 27 are provided to position each bearing pin 24 relative to the holder body 20. A planetary roller 13 is also supported by a bearing 13A on each bearing pin 24 adjacent the planetary gear 12 on the left-hand side as viewed in FIG. 2. Each planetary roller 13 is freely rotatable independently of the planetary gear 12 and, in this embodiment, it has a diameter larger than that of the planetary gear 12.

A sun gear 10 meshing with the planetary gears 12 is disposed coaxially with the holder body 20 and is fitted to an outer peripheral portion of a main shaft 28 with a key 10A interposed therebetween. The main shaft 28 is in turn supported rotatably on inner peripheral portions of the holder body 20 by bearings 29 and 30. In this embodiment, a collet 32 is attached to a projecting end portion of the main shaft 28, and is adapted to be reduced in diameter by tightening an fastening nut 33 to hold a shank portion of a tool, e.g., an unillustrated drill bit. A sun roller 11 is supported by a bearing 11A on the main shaft 28 adjacent the sun gear 10 so as to be freely rotatable independently of the sun gear 10, as in the case of the planetary rollers 13 and the planetary gears 12. The sun roller 11 has a rolling contact with the planetary rollers 13.

An internal gear wheel 14 disposed so as to mesh with and surround the outer peripheries of the planetary gears 12 is fixed to a case 36 by a pin 34. The case 36 is positioned and fixed to the body of the machining center, not shown, by a rotation-stop block 39 having a positioning pin 38. Bearings 40 are interposed between the case 36 and the holder body 20 to rotatably support the holder body 20 at the outer periphery thereof. An outer ring 15 is disposed adjacent the internal gear wheel 14 and is fixed to the case 36. The outer ring 15 has a rolling contact with the planetary rollers 13.

A liquid coolant, which is supplied from a passage 43 formed in the positioning pin 38 of the rotation-stop block 39 through a pipe 44, is jetted to a tool held by the collet 32 through a nozzle 50 formed between an outer peripheral surface of a front end portion of the case 36 and an inner peripheral surface of a nozzle cover 48 fitted around the case 36. This coolant may be utilized to cool at least the inner gear wheel 14, thereby preventing increase in the temperature of the inner gear wheel 14, which would be detrimental to the gear transmission functions.

In the thus-constructed tool holder, an input torque applied to the holder body 20 is transmitted to the sun gear 10 by rolling of the planetary gears 12 along the inner gear wheel 14 at an increased speed ratio according to the pitch circle diameters of the gears, thereby rotating the tool at an increased speed. In this embodiment, the freely rotatable rollers 11 and 13 in a rolling contact with each other are disposed on the respective transmission shafts, i.e., the main shaft 28 and the bearing pins 24, and are held inside the outer ring 15. The distance between the transmission shafts can therefore be maintained with accuracy by the characteristic of the rollers which can be finished by polishing with higher accuracy as compared with gears, thereby making it possible to maintain the accuracy of the pitch circle diameter of each gear. As a result, the pitch point variation due to error in working the gears and so on and, hence, resulting vibrations and noise can be reduced as compared with transmission using gears alone.

The applicant of the present invention has already proposed a transmission device designed to effect both gear transmission and friction transmission with rollers in such a manner that each of rollers corresponding to those of the described embodiment rotates integrally with the mating gear (Japanese Patent Application No. 63-205232). In this case, the outside diameter of each roller (friction wheel) is the same as the pitch circle diameter of the mating gear rotating integrally with the roller, and the diameter of the addendum circle (outermost diameter) of each gear is necessarily larger than the outside diameter of the corresponding roller. For this reason, at the time of assembly of the holder, the outer ring portion of the case 36 to be assembled last by being fitted in the axial direction interferes with the addendums of the planetary gears, which makes the assembly difficult. This interference can be prevented, if the rollers have no friction transmission functions and if the roller diameter can be determined irrespective of the pitch circle diameter of the gear, as in the case of the above-described embodiment.

Figure 3:
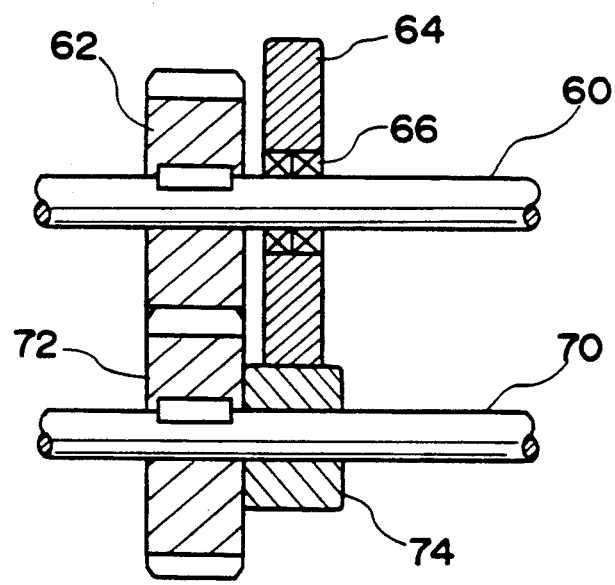
FIG. 3 is a cross-sectional view of another embodiment of the present invention.

In the described embodiment, the present invention is applied to a planetary transmission mechanism, but it is not limited to this and can be applied to ordinary transmission mechanisms having no planetary rollers. FIG. 3 shows another embodiment of the present invention which exemplifies such a case. As illustrated, a first gear 62 is supported on a first shaft 60, and a second gear 72 is supported on a second shaft 70 and is meshed with the first gear 62. This arrangement constitutes a constant-speed transmission mechanism because the two gears have the same pitch circle diameter. Alternatively, a speed increasing or reducing transmission mechanism can be readily attainable if the pitch circle diameters are made different. A freely rotatable roller 64 is supported by a bearing 66 on one of the two shafts, e.g., the first shaft 60 so as to be freely rotatable relative to the first gear 62. In the illustrated example, a stationary roller 74 is integrally fitted to the second shaft 70 and contacts with the freely rotatable roller 64 in a rolling contact manner. Both rollers have no transmission functions since the freely rotatably roller 64 rotates independently of the first gear 62.

This embodiment also achieves the effect of constantly maintaining the distance between the shafts 60 and 70 and, hence the pitch circle diameters of these gears by virtue of the contact between the rollers which can be polished with high accuracy.

In this embodiment, the stationary roller 74 may alternatively be freely rotatably supported by a bearing, not shown, on the second shaft 70 to serve as a freely rotatable roller. Further, the diameter of the freely rotatable roller 64 may be increased so that the roller 64 directly contacts the second shaft 70 in a rolling contact manner while the stationary roller 74 is removed.

In accordance with the present invention, as described above, the advantages of a gear transmission mechanism are retained, while a transmission mechanism capable of smoothly operating and improved in torque transmission efficiency can be obtained.

What is claimed is:

1. A transmission device comprising:
   a first gear supported on a first shaft;
   a second gear supported on a second shaft and meshing with said first gear; and
   a freely rotatable roller disposed at least on said first shaft so as to be freely rotatable independently of said first gear, said freely rotatable roller being in torque non-transmitting rolling contact with said second shaft.

2. A transmission device according to claim 1, wherein a second roller is supported on said second shaft to have a rolling contact with said freely rotatable roller.

3. A transmission device according to claim 2, wherein said second roller is fixed to said second shaft so as to rotate integrally with said second shaft.

4. A transmission device comprising:
 a first gear supported on a first shaft;
 a second gear supported on a second shaft and meshing with said first gear; and
 a freely rotatable roller disposed at least on said first shaft so as to be freely rotatable independently of said first gear, said freely rotatable roller being in rolling contact with said second shaft while transmitting no torque; wherein a second roller is fixedly supported on said second shaft so as to rotate integrally with said second shaft and to freely rotate relative to said second shaft and to be in rolling contact with said freely rotatable roller.

5. A transmission device comprising:
 a sun gear;
 a sun roller having a diameter smaller than said sun gear disposed coaxially with said sun gear and freely rotatable independently of said sun gear;
 a plurality of planetary gears meshing with said sun gear and revolving around said sun gear;
 a plurality of planetary rollers each having a diameter larger than each of said planetary gears disposed coaxially with each of said planetary gears, each of said planetary rollers being freely rotatable independently of said each planetary gear and being in rolling contact with said sun roller;
 an internal gear wheel meshing with said planetary gears and surrounding said planetary gears; and
 an outer ring in rolling contact with said planetary rollers and surrounding said planetary rollers.

6. A transmission device according to claim 5, wherein said internal gear wheel and said outer ring are stationary.

* * * * *